(12) United States Patent
Ariyur et al.

(10) Patent No.: US 7,603,212 B2
(45) Date of Patent: Oct. 13, 2009

(54) REAL TIME PLANNING AND SCHEDULING FOR A TEAM OF UNMANNED VEHICLES

(75) Inventors: Kartik B. Ariyur, Minnetonka, MN (US); Daniel P. Johnson, Fridley, MN (US); Dharmashankar Subramanian, Elmsford, NY (US)

(73) Assignee: Honeywell International, Inc., Morristown, NJ (US)

( * ) Notice: Subject to any disclaimer, the term of this patent is extended or adjusted under 35 U.S.C. 154(b) by 197 days.

(21) Appl. No.: 11/393,086

(22) Filed: Mar. 30, 2006

(65) Prior Publication Data

US 2007/0233338 A1   Oct. 4, 2007

(51) Int. Cl.
*G01C 21/00* (2006.01)

(52) U.S. Cl. .............. 701/23; 700/253; 340/995.19; 340/995.21; 180/167

(58) Field of Classification Search ........... 701/3, 701/50, 23; 700/245, 253; 340/995.19, 995.21, 340/825.49; 180/167; *G01C 22/00, 21/00*
See application file for complete search history.

(56) References Cited

U.S. PATENT DOCUMENTS

| | | | |
|---|---|---|---|
| 4,937,743 A | 6/1990 | Rassman et al. | |
| 5,406,289 A | 4/1995 | Barker et al. | |
| 5,537,119 A | 7/1996 | Poore, Jr. | |
| 5,598,355 A | 1/1997 | Derou et al. | |
| 5,715,165 A | 2/1998 | Luh et al. | |
| 5,758,298 A * | 5/1998 | Guldner ................... | 701/23 |
| 5,959,574 A | 9/1999 | Poore, Jr. | |
| 6,088,644 A * | 7/2000 | Brandt et al. ................ | 701/50 |
| 6,199,000 B1 * | 3/2001 | Keller et al. ................ | 701/50 |
| 6,374,227 B1 | 4/2002 | Ye | |
| 6,704,692 B1 | 3/2004 | Banerjee et al. | |
| 6,816,108 B2 | 11/2004 | Steinlechner et al. | |
| 6,842,674 B2 | 1/2005 | Solomon | |
| 6,876,920 B1 * | 4/2005 | Mailer ..................... | 701/207 |
| 6,907,336 B2 * | 6/2005 | Gray et al. ................ | 701/50 |
| 6,926,233 B1 | 8/2005 | Corcoran, III | |
| 7,069,124 B1 * | 6/2006 | Whittaker et al. ......... | 701/28 |
| 7,079,943 B2 * | 7/2006 | Flann et al. ............... | 701/202 |
| 7,133,044 B2 * | 11/2006 | Maillot et al. ............ | 345/423 |
| 7,200,490 B2 * | 4/2007 | Lange et al. .............. | 701/209 |
| 7,363,154 B2 * | 4/2008 | Lindores .................. | 701/210 |
| 7,451,030 B2 * | 11/2008 | Eglington et al. ......... | 701/50 |
| 2002/0008657 A1 | 1/2002 | Poore, Jr. | |
| 2003/0187560 A1 * | 10/2003 | Keller et al. .............. | 701/50 |
| 2004/0030448 A1 | 2/2004 | Solomon | |
| 2004/0068351 A1 | 4/2004 | Solomon | |
| 2004/0068415 A1 | 4/2004 | Solomon | |

(Continued)

FOREIGN PATENT DOCUMENTS

WO   WO02/09976 A1   12/2002

*Primary Examiner*—Tuan C To
(74) *Attorney, Agent, or Firm*—Fogg & Powers LLC (57) ABSTRACT

A method of implementing a plurality of unmanned vehicles over an obstacle field. The method includes obtaining a physical map of the obstacle field. Discretizing the physical map into traversable edges that avoid the obstacles, the traversable edges meeting at nodes. Replacing sections of the traversable edges that are beyond the maneuverability of the unmanned vehicles with traversable arcs. Determining traverse time parameters associated with paths through the obstacle fields, each path made up of select traversable edges and select traversable arcs and using the traverse time parameters in planning and scheduling the vehicles.

8 Claims, 7 Drawing Sheets

U.S. PATENT DOCUMENTS

| | | |
|---|---|---|
| 2004/0193349 A1* | 9/2004 | Flann et al. .................. 701/50 |
| 2005/0004723 A1 | 1/2005 | Duggan et al. |
| 2005/0075784 A1 | 4/2005 | Gray et al. |
| 2005/0077424 A1 | 4/2005 | Schneider |
| 2005/0107947 A1 | 5/2005 | Han et al. |
| 2006/0090438 A1* | 5/2006 | Hunt et al. ............... 56/10.2 A |

* cited by examiner

REAL TIME PLANNING AND SCHEDULING FOR A TEAM OF UNMANNED VEHICLES

GOVERNMENT LICENSE RIGHTS

The U.S. Government may have certain rights in the present invention as provided by the terms of Contract. No. F33615-01-C-1848 with AFRL/Wright Research Site.

BACKGROUND

Unmanned vehicles (UVs) are becoming more commonly used in operations such as combat, law enforcement and rescue operations. The planning and scheduling of multiple unmanned aerial vehicles (UAVs) performing multiple tasks inside an obstacle rich area is a difficult problem. This is because several problems have to be addressed simultaneously. The problems include resource (vehicle) allocation (assignment) to competing tasks, resource (vehicle) scheduling in time, geometric and spatial constraints imposed by vehicle dynamic capabilities, object-avoidance and inter-vehicle conflict resolution. Although, optimization problems, such as mixed integer nonlinear program (MINLP) problems, may be formulated for the planning and scheduling of vehicles with vehicle dynamics, object-avoidance and conflict-resolution as additional constraints, their complexity and the time constraints that would be required in solving the problems and implementing a system using the MINLP problems in this manner would be less than ideal in a situation that requires a fast response, e.g., a combat situation.

For the reasons stated above and for other reasons stated below which will become apparent to those skilled in the art upon reading and understanding the present specification, there is a need in the art for an efficient and effective method of real time planning and scheduling for a team of unmanned vehicles.

SUMMARY OF INVENTION

The above-mentioned problems of current systems are addressed by embodiments of the present invention and will be understood by reading and studying the following specification.

In one embodiment, a method of forming a traversibility map is provided. The method includes discretizing a map of an obstacle field to obtain traversable edges that avoid the obstacles. The traversable edges meet at nodes. The method further replaces sections of the traversable edges that are beyond the maneuverability of vehicles with traversable arcs.

In another embodiment a method of implementing a plurality of unmanned vehicles over an obstacle field is provided. The method includes obtaining a physical map of the obstacle field. Discretizing the physical map into traversable edges that avoid the obstacles, the traversable edges meeting at nodes. Replacing sections of the traversable edges that are beyond the maneuverability of the unmanned vehicles with traversable arcs. Determining traverse time parameters associated with paths through the obstacle fields, each path made up of select traversable edges and select traversable arcs and using the traverse time parameters in planning and scheduling the vehicles.

In further yet another embodiment, a surveillance system is provided. The surveillance system includes a plurality of unmanned vehicles and a central controller. The central controller is in communication with the plurality of unmanned vehicles. Moreover, the central controller includes a discretization module, a planning and scheduling module and a processor. The discretization module includes instructions to discretize a physical map of an obstacle field. The planning and scheduling module includes instructions to plan and schedule the plurality of unmanned vehicles. The processor is adapted to process the instructions from the discretization module and the planning and scheduling module. In addition, the processor is further adapted to direct the plurality of the unmanned vehicles based at least in part on the instructions from the discretization module and the planning and scheduling module.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide an efficient method of real time planning and scheduling a plurality of unmanned vehicles, such as unmanned aerial vehicles, motor vehicles and the like, over a select area having obstacles. In embodiments of the present invention, a map illustrating obstacles in a select area (an obstacle field) to be traversed by the vehicles are discretized into a traversable graph. The traversable graph is designed to incorporate object-avoidance and conflict resolution aspects into the structure of the traversable graph. Accordingly, only the vehicles dynamics and planning/scheduling over the traversability graph need to be considered. Moreover, in one embodiment, vehicle dynamics are separated from the planning/scheduling sub-problem by removing areas of the traversability graph that the vehicle cannot traverse because of vehicle dynamic limitations.

Figure 1:
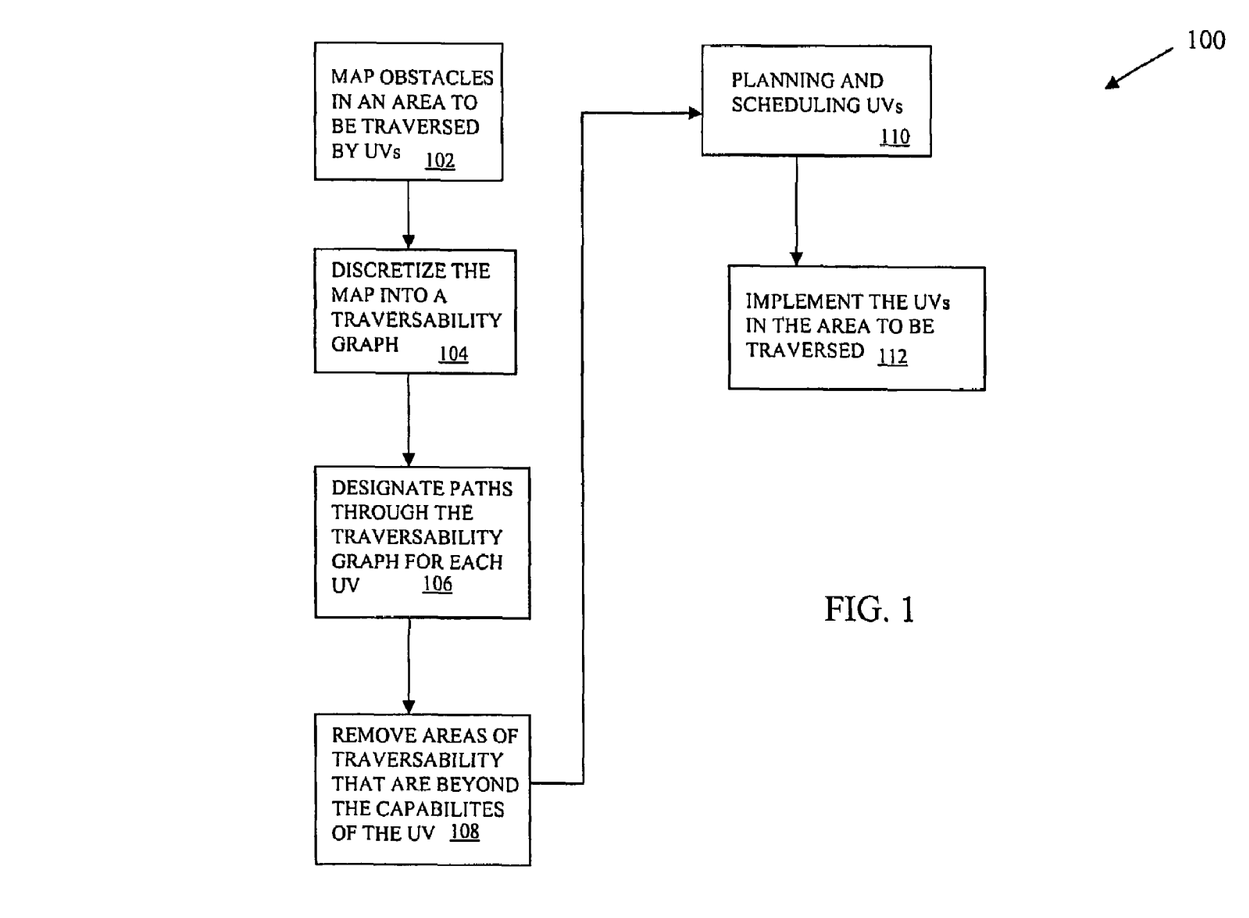
FIG. 1 is a flow diagram of a vehicle implementation of one embodiment of the present invention.

To provide an overview of the present invention, FIG. 1 illustrates a vehicle implementation flow diagram 100 of one method of implementing an embodiment of the present invention. As illustrated, the process begins by mapping obstacles in an area to be traversed by a vehicles (102). The obstacles can be any type of structure, such as buildings, mountains and trees, that a vehicle cannot traverse through. The map is then discretized into a traversability graph (104). In embodiments of the present invention, the map is discretized by computational geometry methods that may include, but is not limited to, Voronoi diagrams and trapezoidal maps. Paths for each vehicle are then designated in the traversability graph (106). Areas of a path in the traversability graph that are beyond the dynamic capabilities are removed (108). For example, traverse edges of a path that cannot be traverse due to the navigation envelope of the vehicle are removed and replaced with traversable arcs that can be traversed. The scheduling of the vehicles is then determined (110). Implementation of the vehicles over the area to be traversed is then perfected (112).

Figure 2A:
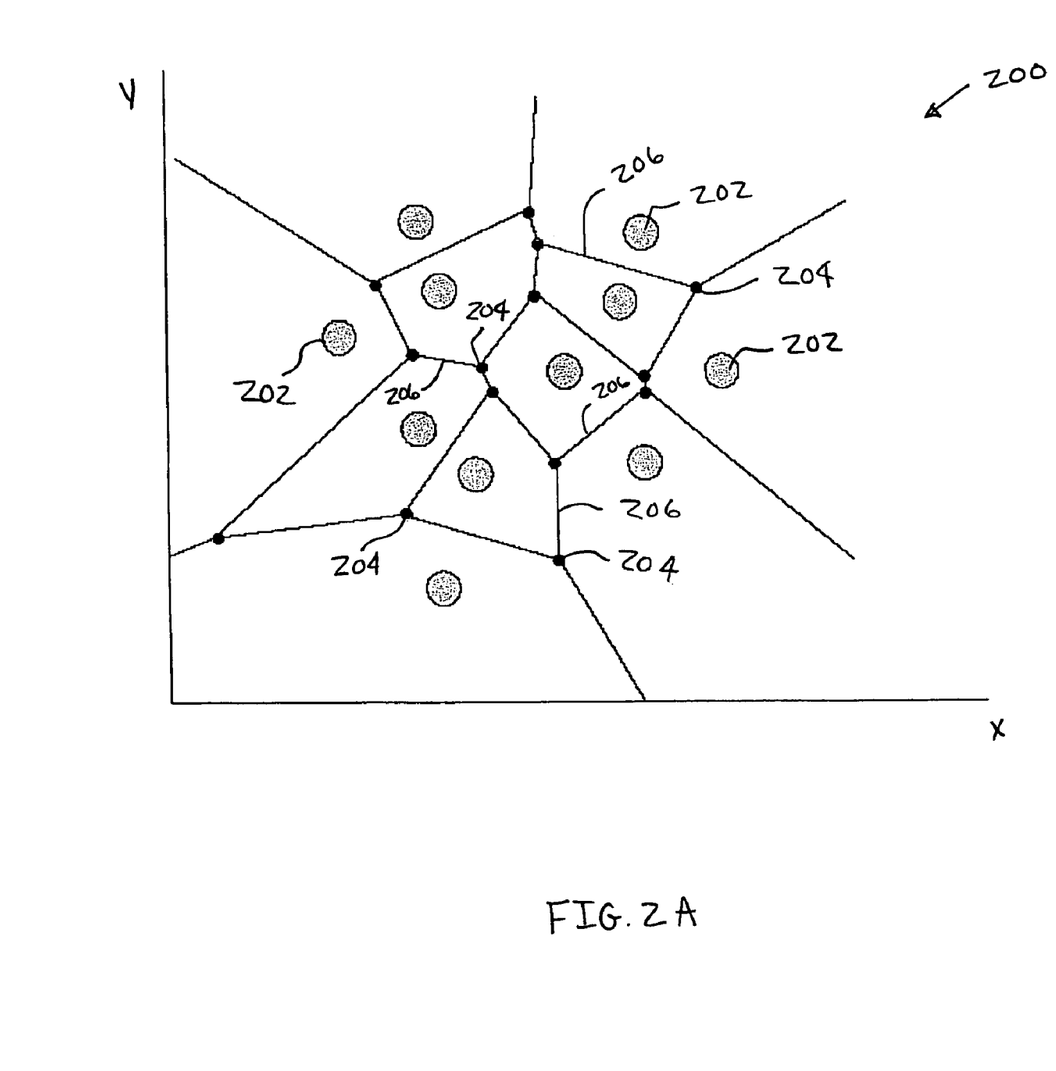
FIG. 2A is a Voronoi diagram used to discretize a map of one embodiment of the present invention.

As stated above, the map is discretized into a traversability graph. One example of discretization of a map given above was with a Voronoi diagram. An example of the use of a Voronoi diagram 200 used to decretize a map is illustrated in FIG. 2A. In FIG. 2A, objects 202 that the vehicles need to transverse around are illustrated. In the Voronoi diagram 200, distances between objects are bisected by traversability edges 206. The traversability edges 206 converge at nodes 204 or vertexes 204. The traversability edges 206 can generally be referred to as edges 206. In a traversability graph, a vehicle travels along traversable paths made up of traversable edges 206 and traversable nodes 204. When the vehicle encounters a node 204, the vehicle may proceeds along another designated traversable edge 206, among the edges 206 that converge to form the node 204, until it arrives at a pre-selected ending location.

Separating the vehicles dynamics from the planning and scheduling tasks is accomplished by incorporating the dynamic charateristics of the vehicle into the traversability graph. As discussed above, a path upon which a vehicle is to travel may not be within the capabilities of the vehicle. This typically occurs at a node 204 where the path of the vehicle changes directions. Accordingly, the turn radius of a vehicle at a select velocity has to be taken into consideration in setting out the path for a vehicle to travel especially near the nodes 204. To make sure a vehicle can traverse a path, sections of the edges 206 in the traversability graph near the nodes 204 may be removed and replaced with traversable arcs that are within the navigational envelope of the vehicle. An example of a traversable arc or arc 308 can be seen in FIG. 3.

Figure 2B:
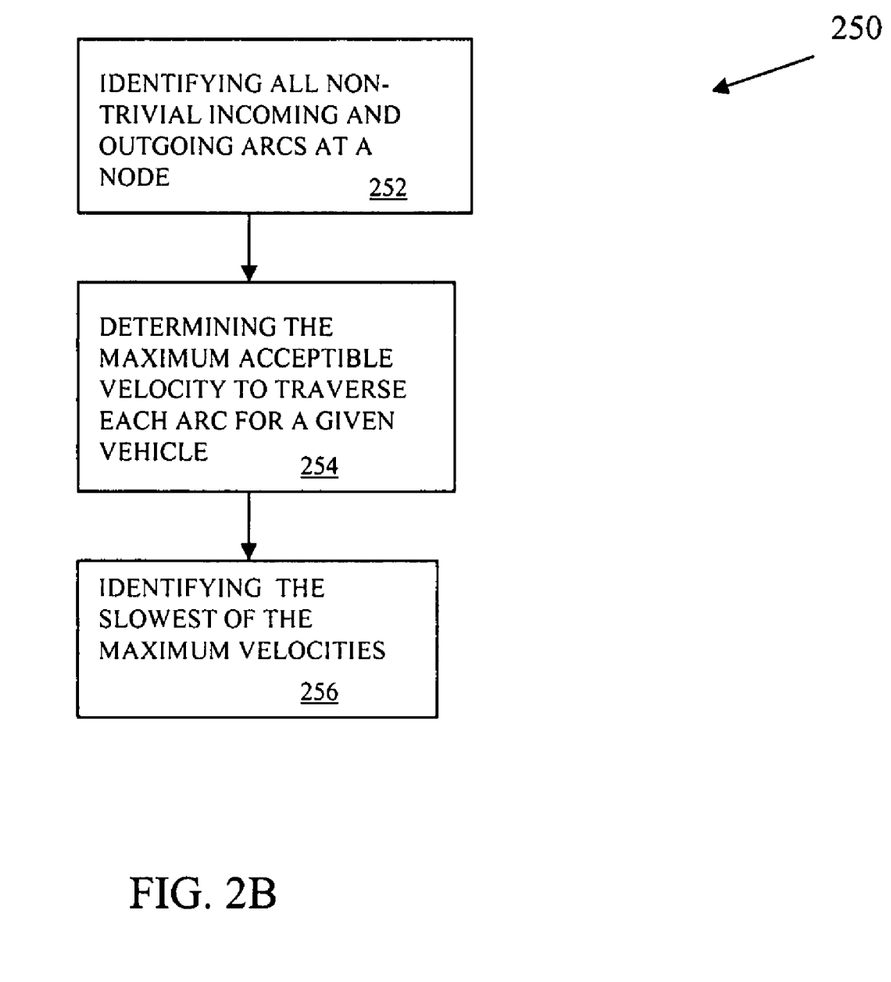
FIG. 2B is a flow diagram illustrating the determination of a traverse time parameter of one embodiment of the present invention.

In one embodiment of the present application, each arc in the traversable graph is associated with a traverse time parameter. The parameter is conservatively determined by taking into consideration the velocity used by a vehicle to traverse each arc associated with a node in completing an arc-traversal. Conservatively determining the parameter as described above assures that every vehicle location plan/schedule that is generated by a planner is dynamically feasible. Referring to FIG. 2B, a flow diagram illustrating one method of determining a traverse time parameter of the present invention is provided. This is done by considering every node 204 on the traversability graph and enumerating all non-trivial combination of incoming and out-going arcs at this node 204 (252). Each combination of in-coming and out-going arcs at the node gives a maximum acceptable velocity at the node 204, such that an associated turn in a path is feasible (254). The slowest acceptable velocity is then identified (256). Taking the minimum over all such maximums (or all such turning combinations) will result in a velocity that will allow every turn at a node or vertex. This min-max calculation results in a mapping of velocities (or speeds) to nodes in the traversability graph. Thus, for each given arc that connects two nodes, a starting vertex velocity and an ending vertex velocity can be determined with the min-max calculations.

An optimal control problem that takes the corresponding vehicle across the arc is then solved. The control problem takes into consideration terminal velocity constraints (start velocity and end velocity) as well as the upper bounds on velocity and acceleration to accomplish the least-time maneuver. This is a one dimensional dynamic optimization problem that can be analytically characterized. The resulting time for a vehicle to traverse the arc is associated with the corresponding arc. If the unmanned vehicles are heterogeneous vehicle types with respect to vehicle dynamics, a separate optimal control problem has to be resolved for each vehicle and the corresponding times to traverse a specific arc for each vehicle is designated in the traversability graph. Accordingly, the geometry and vehicle dynamics are converted into traverse time. These systematic steps of decomposition leave the planning and scheduling problems alone to be addressed by a traceable mathematical formulation in a mixed variable vehicle planner.

Figure 3:
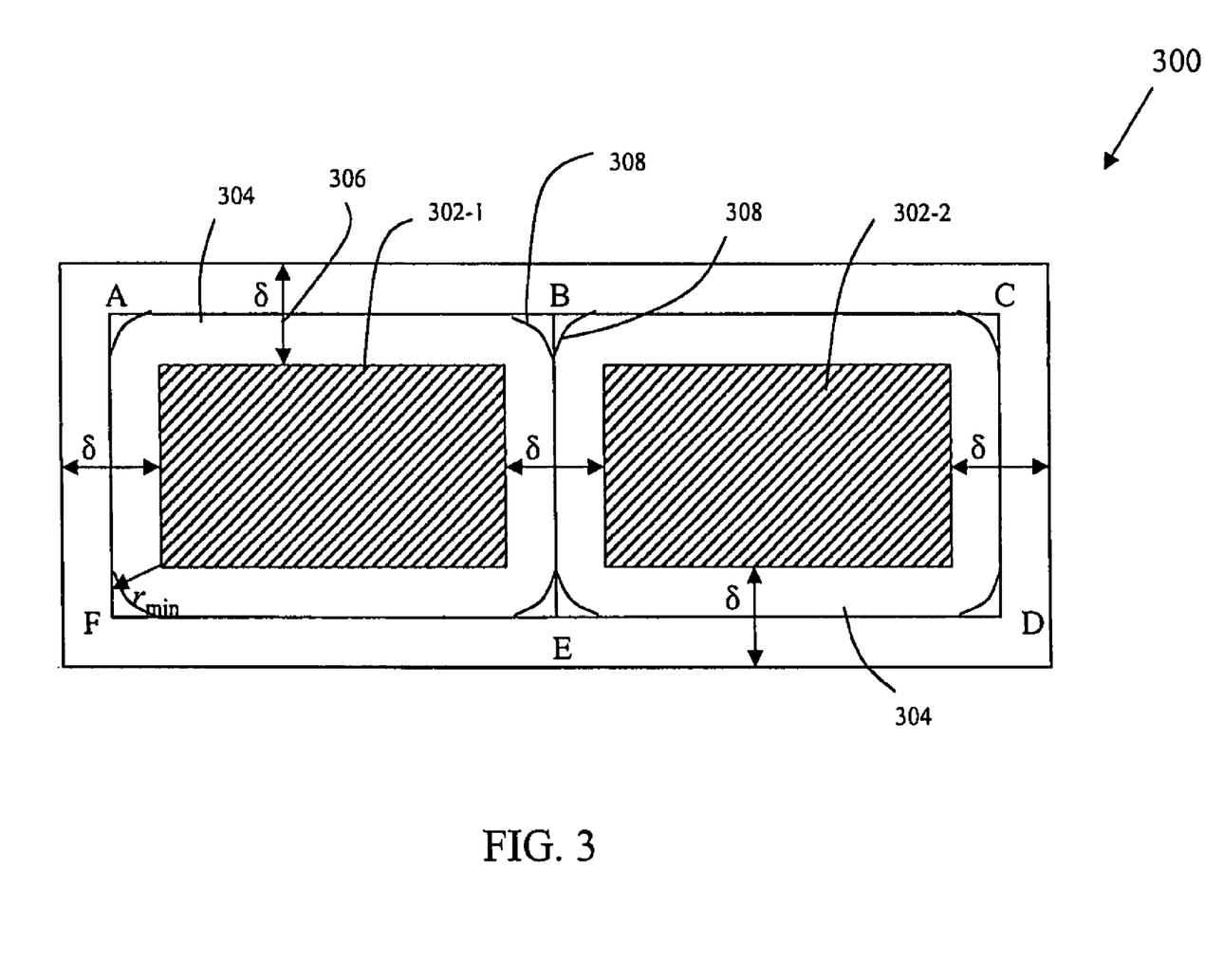
FIG. 3 is an illustration of a section of a traversability graph of one embodiment of the present invention.

Referring to FIG. 3 an example of an obstacle field and traversability graph 300 of one embodiment of the present invention is illustrated. In this example, two objects designated as 302-1 and 302-2 need to be traversed around. More importantly, this example, illustrates how vehicle characteristics are taken into consideration in setting a path of traverse. This example uses a fixed wing aircraft as a vehicle but it will be understood that the present application applies to all types of unmanned vehicles. The traversability graph 300 consists of the vertices (or nodes) A through F and the edges AB, BC, DE, EF, AF, BE, and CD. For this example edges AB, BC, DE, EF, have lengths of 200 m and edges AF, BE, and CD, have lengths of 100 m. A tolerance δ 306 around each of the edges is given in this example as 20 m.

Examples of times of traverse over the edges with a hypothetical fixed wing aircraft are: minimum velocity $V_{min}=10$ m/s, maximum velocity $V_{max}=40$ m/s, and maximum acceleration (and deceleration) $a_{max}=10$ m/s$^2$. Instead of solving a variational problem with an objective function, we simply illustrate by obtaining traverse times that the vehicle can attain. The sharpest turn radius possible for the aircraft at each of the 90° turns is given by $$r_{min} = \frac{V_{min}^2}{a_{max}},$$

yielding $r_{min}=10$ m. We consider the problem where the vehicle makes this sharpest turn at each of the graph vertices and is therefore flying at its smallest velocity $V_{min}$ and tries to cover the distances over the graph edges as fast as possible.

The time to traverse each of the arcs $T_{arc}$ is $$T_{arc} = \frac{r_{min}\theta_{arc}}{V_{min}} = \frac{\pi}{2}s,$$

and since each arc 308 reduces a length $r_{min}=10$ m twice from the corresponding edges, we are left with edges of lengths 80 m (AF, BE, CD), 180 m (AB, BE, EF, DE), and 380 m (AC, DF). We next determine the time of traverse on each of these edges. On the short 80 m edges, there isn't sufficient distance to accelerate to $V_{max}$. The vehicle accelerates over half the edge to a maximal velocity obtained from $$40 = V_{min}t + \frac{1}{2}a_{max}t^2, \text{ giving } t = 2s$$
$$\overline{V} = V_{min} + a_{max}t = 30 \text{ m/s}$$

yielding total time of traverse of 4 seconds. The time of traverse over the 180 m and 380 m edges consists of segments of acceleration, cruise and deceleration—

$$t_{accel} = \frac{V_{max} - V_{min}}{a_{max}} = 3s = t_{decel}$$
$$S_{accel} = V_{min}t_{accel} + \frac{1}{2}a_{max}t_{accel}^2 = 75 \text{ m} = S_{decel}$$
$$t_{cruise} = \frac{S_{total} - S_{accel} - S_{decel}}{V_{max}},$$

giving traverse times of 6.75 s and 11.75 s for the 180 m and 380 m edges respectively. Each of the edges touches two arcs and the total time of traverse is the time to traverse the straight part with that of two half arcs. Hence, total time is obtained by adding $T_{arc}$ to the time of traversing the straight line parts. Thus, edges AF, BE, and CD have traverse times of $4+\pi/2$ s, edges AB, BC, DE, and EF have traverse times of $6.75+\pi/2$ s, and edges AC and DF have traverse times of $11.75+\pi/2$ s.

Figure 4:
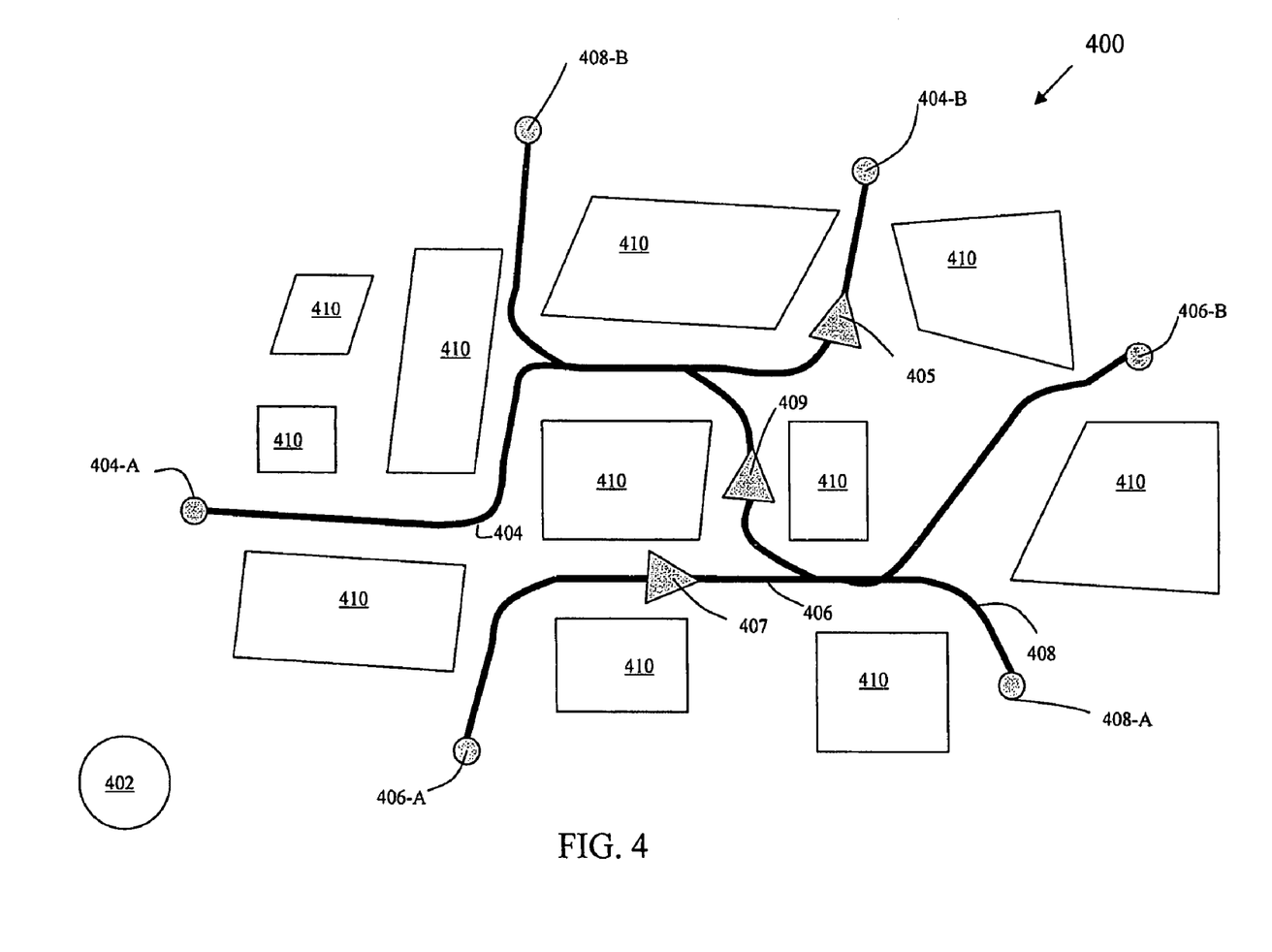
FIG. 4 is an illustration of the implementation of a planning and scheduling scheme over a traversabililty graph of one embodiment of the present invention.

FIG. 4 illustrates a real time planning and scheduling system 400 over a traversability map of one embodiment of the present invention. As illustrated, the system 400 includes a plurality of vehicles 405, 407 and 409 that are remotely controlled by a controller 402. The map includes objects 410, such as buildings that need to be traversed around. As described above, traversable paths 404, 406 and 408 made up of traversable edges and traversable arcs are formed in the traversability map. Each path includes a starting point and an ending point. For example, path 404 has a starting point of 404-A and an ending point of 404-B, Path 406 has a starting point of 406-A and an ending point of 406-B. Similarly, path 408 has a starting point of 408-A and an ending point of 408-B. Although, not shown in this example, a path may have the same starting and ending points. Further illustrated in this example are vehicles 405, 407 and 409 which respectively traverse paths 404, 406 and 408. As discussed above, the vehicles 405, 407 and 409 are centrally controlled by controller 402.

Figure 5:
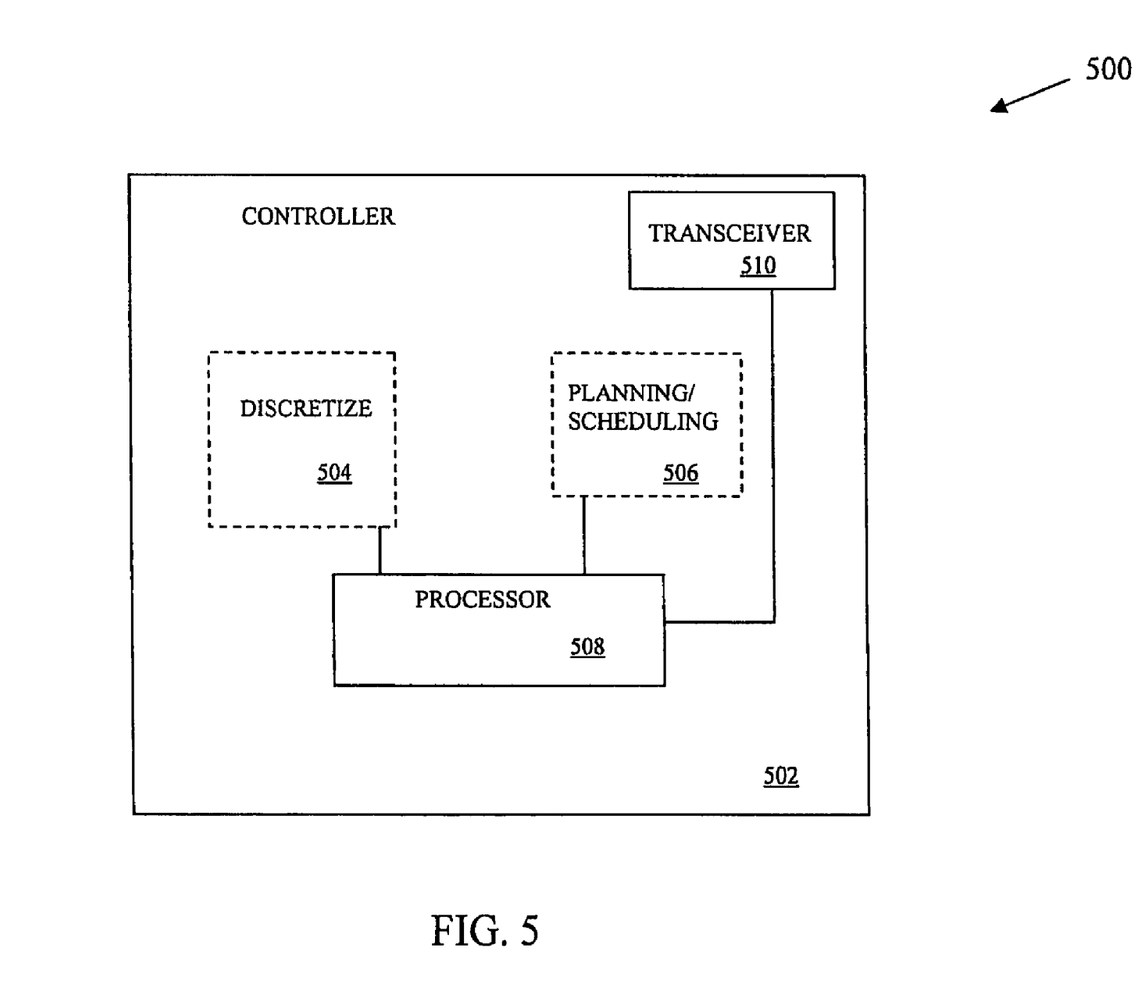
FIG. 5 is a controller of one embodiment of the present invention.

An example of a controller 502 of one embodiment of the present invention is illustrated in FIG. 5. This controller 502 includes a processor 508 and a transceiver 510. The processor is designed to, among other things, discretize a given map, create vehicle paths in the discretized map to create a traversability graph and implement planning and scheduling parameters for the vehicles to use in traversing their respective paths. The transceiver is designed to communicate with each of a plurality of unmanned vehicles to provide instructions to and receive information back from the vehicles. A discretization module 504 and a planning and scheduling module 506 are also illustrated in FIG. 5. The discretization module 504 and a planning and scheduling module 506 provide instructions to the processor 508.

As discussed above, systems of the present invention provide a bi-simulation that allows for the separation of the maneuvering problems, as described above with the traversability graphs, from planning and scheduling problems. An example of a planning and scheduling system that can be incorporated with the traversability graph as described above is provided below. The planning and scheduling system (or solver) is incorporated in the planning and scheduling module 506 of the controller 502 in FIG. 5. In one embodiment, the solver includes resources and tasks. The resources are the vehicles. Each resource has a time-varying state. The state of the vehicle is either a graph node/intersection or a graph edge/route. Accordingly, the vehicles are either at an intersection or in transit along an edge.

A task consists of a pair of associated state transition operators, one to mark the start of the task and one to mark the end of the task. In particular, the first operator marks the acquisition of the resource and the transition from an initial state to a duration state. The second operator marks the release of the resource and the transition from the duration state to a final state. Accordingly, all tasks specify three states for any resource which has been assigned, an initial state, a transitional state and a final state. The initial state preconditions the resource so it is able to execute the task. The transitional state and final state are then assigned to the resource by the execution of the task according to timing variables of the task.

The tasks are either transit tasks or servicing tasks. A transit task cites a vehicle, a starting intersection node, an ending intersection node and route between the two according to the traversability graph. A servicing task cites a vehicle (or resource) and an intersection node where the vehicle is to be serviced. All tasks have two time variables, a starting time and an ending time. The duration of the task is the difference between the two times. In one embodiment, the only way to change the state of a resource is by assigning it a task that changes the state of the resource.

Embodiments implement deconfliction requirements that prevent two or more tasks from overlapping during the planning phase. An example of a conflicting requirement that may be prohibited is where two or more tasks are assigned to the same resource (vehicle) during time periods that overlap. Other conflicting requirements are anticipated and the preset invention is not limited to conflict requires relating to resources with tasks that overlap in time. Moreover, in embodiments, state-transition requirements are also used. The state-transition requirements are constraints that the resource states must meet in completing the task preconditions, transitional and final states.

Some embodiments also use partially-assigned tasks and cyclic tasks. A partially assigned task is a task where not all of the parameters are identified or not all of the timing variables are yet assigned. For example, a transit task along a particular route or path may be set, but a particular vehicle may not yet be assigned to the transit task right away. A particular schedule is a set of partially-assigned tasks. A cyclic task is a sequence of partially-assigned tasks that need to occur on a roughly periodic basis until the schedule ends. The "roughly periodic" requirement is given through timing requirements between a task and its successor. The number of tasks in a cyclic task is not fixed and is determined by meeting various scheduling requirements.

The partially assigned tasks in some embodiments also permit exploitation of flight management systems and associated trajectory planning on individual vehicles. If a vehicle reaches a waypoint ahead of time or it reaches some point late, it can either correct itself by speeding up or slowing down or send updates to the central planner if the required timing is not possible, and the multi-vehicle resource allocation can be replanned (the optimization problem is solved again with the present conditions as the initial conditions). Replanning is also anticipated when a vehicle is shot down or otherwise incapacitated.

Timing requirements in embodiments of the present invention are linear inequalities relating to the time variables. A timing requirement for a transit task requires the duration of the transit task to match the time it would take an associated vehicle to traverse the distance of a route at a select speed. The timing requirement on a serving task is a duration that is greater than the servicing task requires. The timing requirements on cyclic tasks set up upper and lower bounds on the starting times between tasks.

Embodiments of scheduling include goals. The goals may include a list of transit tasks and locations that that must be visited, a list of servicing tasks for each vehicle, a list of cyclic transit tasks of locations that must be visited on a period basis, timing requirements and the like. A schedule includes a complete list of tasks and resource time-varying states. The time varying states meet timing requirements, state-transition requirements, deconfliction requirements and no-loitering requirements. The solver assigns resources to the goals, adds new transit and servicing tasks to transition the resources into the correct states and sequence and set timings for all of the tasks.

In some embodiments of the present invention, a mixed-variable solution is used for the planning and scheduling of vehicles. This mixed-variable solution uses discrete and continuous variables in planning and scheduling. Flexibility of this approach is one benefit. The structure of the problem is allowed to vary according to the values of the discrete variables. For example, in regards to a vehicle location problem, a periodic goal might be to visit a particular location at least every 10 minutes over a mission timeline of 4 hours. By using this method the actual number of visits may vary between different possible solutions which will change equations of the problem. Moreover, the mixed variable solution allows for the optimization and the determination of feasibility of problems with partial assignments of the discrete variables. Examples of discrete variables include; what tasks to schedule and assign to each resource, what resources and states to assign to scheduled tasks, sequencing tasks involving a particular resource, sequencing tasks involving a particular edge or location, how many cyclic tasks are needed to satisfy each cycle task specification and what goals to assign each resource and the sequence of the goals.

Figure 6:
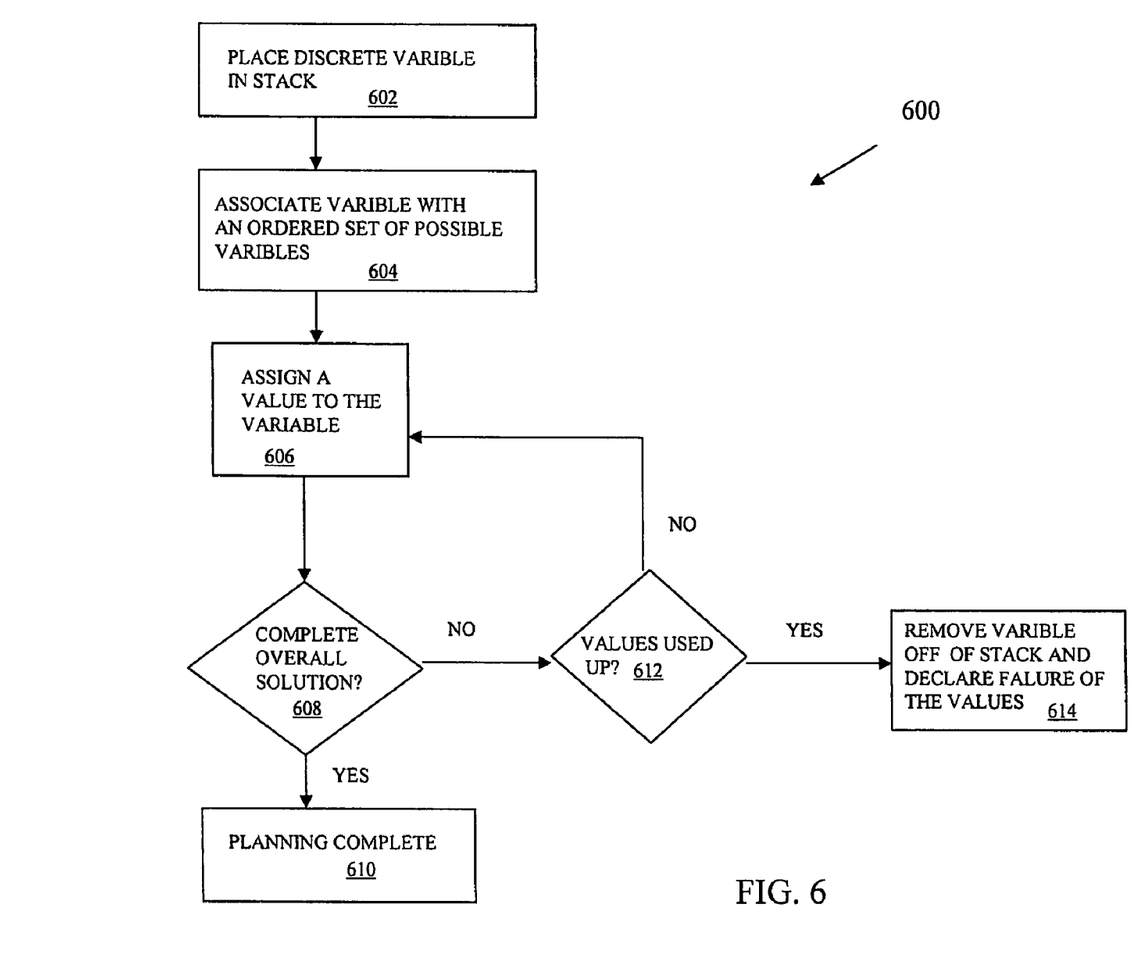
FIG. 6 is a flow diagram illustrating the use of discrete variables of one embodiment of the present invention.

Referring to FIG. 6, a flow diagram 600 illustrating the use of discrete variables of one embodiment of the present invention is provided. As illustrated, the discrete variables are placed in a first-in-first-out stack (602). Each discrete variable is then associated with an ordered set of possible values based on the partial assignments up to that point (604). The solver then assigns a value from the set of possible values to the discrete variable (606). It is then determined if an overall solution (plan) can be completed (608). If an overall solution can be completed (608), planning is complete (610). If an overall solution can not be completed (608), it is determined if any other values in the set of possible values have been tried (612). If all the values have been tried (612), the associated discrete variable is removed from the stack and a failure is declared regarding the discrete variable (614). If all the values in the set of values have not been tried (612), the process continues by assigning another value from the set of values at (606).

The continuation variables in the mixed-variable solution include, what initial time and final time is required for each task and what duration of time will each vehicle spend on a given task. In embodiments of the present invention, the mixed-variable solution uses the traverse time (the duration of time) as determined by the traversability graph. Hence a mixed variable vehicle planner of embodiments of the present invention use traverse time, as determined by the traversability graph of the present invention, as the parameter in its planning and scheduling formation.

The methods and techniques described herein are implemented by a real time planning and scheduling system for a team of unmanned vehicles. Devices of the system that make up the system may be implemented in digital electronic circuitry, or with a programmable processor (for example, a special-purpose processor or a general-purpose process such as a computer firmware, software, or in combinations of them). Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A surveillance system, the system comprising:
a plurality of unmanned vehicles; and
a central controller in communication with the plurality of unmanned vehicles, the controller including,
　a discretization module including instructions to discretize a physical map of an obstacle field,
　a planning and scheduling module including instructions to plan and schedule the plurality of unmanned vehicles, and
　a processor adapted to process the instructions from the discretization module and the planning and scheduling module, the processor further adapted to direct the plurality of the unmanned vehicles based at least in part on the instructions from the discretization module and the planning and scheduling module.

2. The system of claim 1, wherein the controller further comprises a transceiver adapted to communicate with each of the unmanned vehicles.

3. The system of claim 1, wherein each unmanned vehicle includes a transceiver adapted to communicate with the central controller.

4. The system of claim 1, wherein the instructions to discretize the physical map in the discretization module includes instructions to generate traversable edges that meet at nodes while avoiding obstacles in the obstacle field and replace sections of the traversable edges that are beyond the maneuverability of unmanned vehicles with traversable arcs.

5. The system of claim 4, wherein the processor is further adapted to determine traverse times of paths made up of the traversable edges and traversable arcs.

6. The system of claim 5, wherein the processor is further adapted to determine the traverse times of the paths and associate the traverse times with the respective paths.

7. The system of claim 6, wherein determining the traverse times of paths made up of the traversable edges and traversable arcs further comprises:
    determining the slowest maximum velocity of a vehicle to traverse each traversable arc at a node.

8. The system of claim 6, wherein the planning and scheduling module includes a mixed variable vehicle planning scheme that implements the traverse times.

* * * * *

UNITED STATES PATENT AND TRADEMARK OFFICE
CERTIFICATE OF CORRECTION

PATENT NO.      : 7,603,212 B2                               Page 1 of 1
APPLICATION NO. : 11/393086
DATED           : October 13, 2009
INVENTOR(S)     : Ariyur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 169 days.

Signed and Sealed this

Fifth Day of October, 2010

David J. Kappos
*Director of the United States Patent and Trademark Office*